Jan. 12, 1943.                E. F. JOYCE                2,308,286
                             TAIL JOINT COVER
                           Filed Jan. 25, 1941
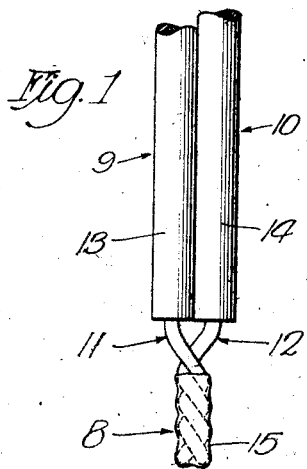
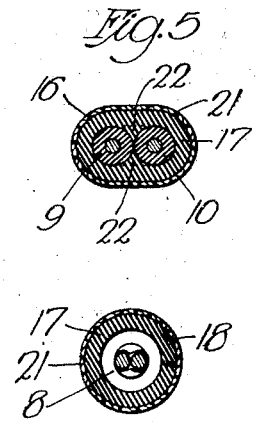
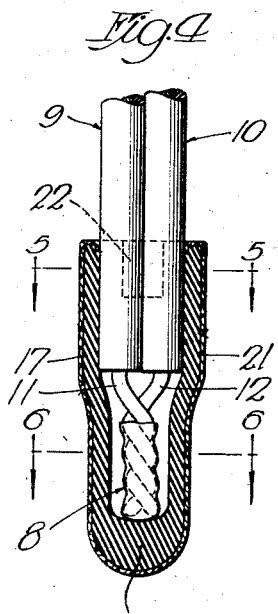
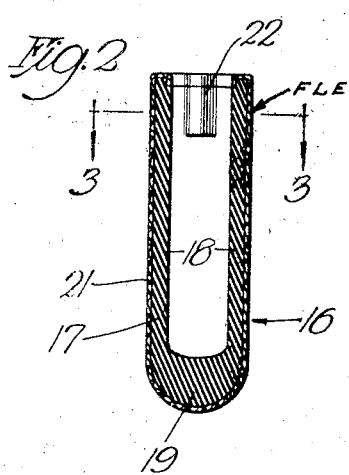
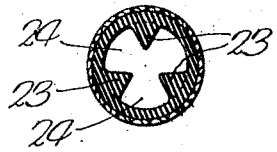
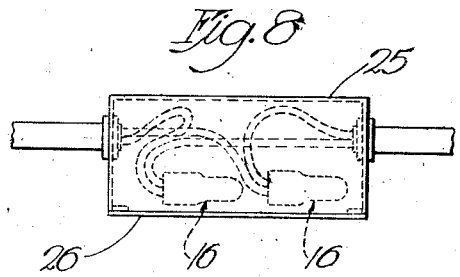
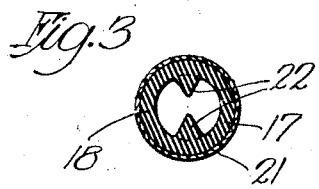
INVENTOR.
Edward F. Joyce
BY Mann, Brown & Co.
ATTYS.

Patented Jan. 12, 1943

2,308,286

UNITED STATES PATENT OFFICE 2,308,286

TAIL JOINT COVER

Edward F. Joyce, Kansas City, Kans.

Application January 25, 1941, Serial No. 375,939

6 Claims. (Cl. 174—87)

This invention relates to devices associated with electrical equipment and more particularly to tail joint covers for the joints of electrical conductors.

One of the objects of the invention is the provision of a new and improved tail joint cover that may be easily and readily applied, and when applied will function efficiently.

Another object of the invention is the provision of a new and improved tail joint cover that is so constructed that when applied to the joint of two or more electrical conductors it will form, with the insulation on the connected conductors, a waterproof or weatherproof joint.

A further object of the invention is the provision of a new and improved tail joint cover that is provided with means for preventing mechanical abrasion of the protective material and yet will permit the cover or shield to conform to the cross-sectional form or shape of the two conductors.

A still further object of the invention is the provision of a new and improved tail joint cover that is inexpensive to manufacture, efficient in use, easily attached, and that will remain in position when applied.

Other and further objects and advantages of the invention will appear from the following description, taken in connection with the accompanying drawing, in which Fig. 1 is a side elevation of a tail joint with the severed ends of a conductor or two conductors;

Fig. 2 is a vertical section of the tail joint cover;

Fig. 3 is a section on the line 3—3 of Fig. 2;

Fig. 4 is a vertical section of the cover as shown applied to the joint;

Fig. 5 is a section on line 5—5 of Fig. 4;

Fig. 6 is a section on line 6—6 of Fig. 4;

Fig. 7 is a cross-section of a modified form of construction corresponding to section shown in Fig. 3; and Fig. 8 is a side elevation of a junction box showing the invention in position therein.

In the interest of safety the various associations of electric inspectors, contractors, manufacturers, insurance underwriters, and the like, have rules and regulations requiring, among many other things, that the exposed connections or joints between electric conductors, including tail joint connections, be thoroughly covered and protected by proper insulation. This is usually accomplished by twisting and soldering the ends of the wire and subsequently taping the ends, after which the joint is painted with insulating material or an internally threaded cap of insulating material, such as hard rubber, Bakelite, or the like, is employed which is screwed over the joint formed by the twisted ends of the conductors for clamping them together for protecting the same.

Both methods of forming the joints are objectionable. The first is objectionable because of the great amount of time employed to tape and paint the joint. The latter method is objectionable also because of the recesses or passages formed at opposite sides of the wires, which provide passages through which moisture, dust or other foreign matter may pass into contact with the twisted wires, thus causing leaks along these recesses or passages. These passages are formed when the joint is taped due to the curvature of the insulation and for this reason the joint is painted with some insulating material. Painting the joint, however, requires a separate or additional operation. The internally threaded caps that are employed for protecting the twisted ends of the conductor wires when applied to the joint will also form triangular passages at opposite sides of the wires due to the curvature of the insulation.

The present invention seeks to remedy these difficulties by the provision of a cover that may be applied to a tail joint in a few seconds, and when applied will automatically form a water or moistureproof connection.

Referring now to the drawing, the reference character 8 indicates an electrical joint between the severed ends of a conductor or rather between two conductors 9 and 10 and which, for the sake of convenience of description, will be referred to as two conductors. The conductors 9 and 10 comprise the conductor wires 11 and 12 which have the conventional insulation 13, 14, thereon, as is usual in such constructions. The joint 8 is formed in the usual manner by twisting together the ends of the stripped conductor wires 11, 12, and then soldering the joint, as at 15, in the usual manner.

In the form of construction selected to illustrate one embodiment of the invention, a conventional tail joint is shown, which is adapted to be protected and insulated by a suitable tail joint cover 16. This cover comprises an inner cover cap, or cup-shaped member 17, which is preferably of soft rubber having the side walls 18 and a bottom wall 19 of considerably greater thickness than the side wall 18. The bottom wall 19 is made thicker so as to give greater protection to the exposed ends of the conductor wires as otherwise these ends might pierce the cover in manipulating the joint while forcing it into the outlet or junction box.

The upper or open end of the cover 17 is provided on its inner surface with a plurality of ribs 22, the side walls of each of which converge inwardly, as shown in Fig. 3.

For convenience of description the open end of the joint cover 17 will be referred to herein as the upper end.

The number of ribs employed will depend on the number of conductors forming the joint. Where two conductors, as shown in Figs. 1 to 6, are employed there will be two, one for each passage formed between the curvatures of the insulations and wall of the cover 16. These ribs extend down into the cover a substantial distance and are preferably integral with the joint cover. They are adapted to close the triangular spaces formed at opposite sides of the wires and between the same and the wall of the joint-cover 16, as shown in Fig. 5.

Surrounding the tail joint cover or cuplike soft rubber member 18, and incorporated in the soft rubber, is a suitable protecting member 21. In the form of construction shown this protecting member 21 is a fabric member and is capable of yielding to a limited extent. This fabric member is also cup-shaped and surrounds the cover 17. The open end of the cup-shaped fabric member extends inwardly over the open end of the joint cover 17, and inwardly and downwardly over the upper ends of the ribs 22, for protecting the same, as shown in Fig. 2 of the drawing. This fabric is employed as a protection for the soft rubber against abrasion or mechanical injury of any kind. If an electrical joint is formed by three or more wires or conductors it is evident that there will be additional triangular spaces formed between the cover wall and the curved surfaces of the conductors.

In Fig. 7 is shown a cross-section of a tail joint cover which is adapted for receiving a tail joint formed by three conductor wires. In this form there will be three ribs 23, forming three spaces 24, for receiving the wires. The ribs 23 will engage between adjacent wires for sealing the space formed by the curved peripheral surfaces of the wires.

In the use of the device the adjacent ends of the conductors 11, 12, are stripped, as shown in Fig. 1, so as to bare the wires, and then these wires are twisted together, as shown in said figure, after which they are soldered to form a satisfactory electric joint. The soft rubber cover or cup-like member 16 is then applied by forcing the same over the twisted wires and onto the conductor material with the ribs between adjacent conductors, so that these ribs will engage in the grooves or spaces formed by the side wall of the joint cover and the curved periphery of the insulating material 13 and 14. This operation will distort the upper end of the cover and stretch it somewhat so as to make a snug fit about the insulation of both conductors, as shown in Fig. 5. The upper end of the cover will become oblong in cross section, while the lower end of the cover will, of course, remain circular, as shown in Fig. 6. The friction of the soft rubber against the insulation of the conductors will retain the cover in position thereon. The outer covering or fabric 21 will not only protect the soft rubber from mechanical abrasion or injury from external forces but will also prevent tearing of the soft rubber should it become necessary to remove the cover for any reason after the same has been applied.

In Fig. 8 is shown a junction box, illustrating the use of the tail joint covers, and in this figure the junction box 25 is of usual or any well known construction having the removable cover 26. After the joint covers have been applied they may be forced into the junction box and the lid or finish plate applied as is usual in such constructions.

It is thought from the foregoing, taken in connection with the accompanying drawing, that the construction and operation of my device will be apparent to those skilled in the art and that changes in size, shape, proportion and detail may be made without departing from the spirit and scope of the appended claims.

I claim as my invention:

1. A device for use in protecting tail joints in electrical conductors having insulation thereon, comprising a rubber cap member having an endless sidewall and having ribs angular in cross section extending inwardly from the inner sides of said side wall, said ribs conforming to the spaces formed between the insulation of said conductors and the side wall of said member when said member is slipped over said joint and onto the insulation of said conductors for forming a water tight joint to prevent water from entering said cap.

2. A tail joint cover for electrical conductors, comprising a soft rubber cap member having its bottom wall materially greater in thickness than its side wall, the side wall of said cap member being continuous in cross-section from one end of the cap member to the other, ribs secured to the inner wall and extending inwardly therefrom and adapted to engage between the insulation on adjacent conductors for preventing the entrance of moisture within said cap member while said cover is in use.

3. A tail joint cover for electrical conductors, comprising a soft rubber cap member having its bottom wall materially greater in thickness than its side wall, said cap member comprising a socket with bottom and integral side walls, said side wall being continuous in cross-section, ribs secured to the inner wall of said member and extending radially inwardly, each rib having its side walls converging inwardly forming a pointed projection, and a fabric embedded in the exterior surface of said cap member for protecting the same.

4. In combination, a plurality of electric conductors having insulation thereon, said insulated wires being separate and independent of each other and having their adjacent ends stripped of insulation and connected together, a distortable cup-shaped cover member having a socket with its side wall continuous in cross-section into which the stripped wires and a portion of the insulated wires extend, ribs extending inwardly from the inner side of the side wall of said cover and extending downwardly from the open end of said cover a substantial distance, said ribs conforming to the adjacent walls of said conductors and frictionally engaging the same, said cover having its bottom wall thickened, and an outer protective covering surrounding said distortable cover and carried thereby.

5. In combination, three independently insulated conductors, each having one end stripped of insulation, the stripped ends of said conductors being twisted together and soldered to form a tail joint, a cup-shaped cover of soft rubber material including a socket for inclosing said joint and extending onto the insulation of said conductors and frictionally engaging the same, said socket having a side wall continuous in cross-section having three projections extending inwardly from its inner wall adjacent the open end of the cover and equispaced circumferentially about the same, the side walls of each projection converging inwardly and engaging between adjacent conductors.

6. In combination, a plurality of insulated individual conductors, said conductors having their adjacent ends stripped of insulation and connected together in electrical contact, a cup-shaped cover member of rubber enclosing the connected ends of said conductors and extending onto the insulation of said members, said cup-shaped member having its side wall continuous in cross-section, the inner open end portion of said member having inwardly extending rubber projections, each projecting between and frictionally engaging the insulation of two adjacent conductors to frictionally hold said member in position, and to form a water tight joint for preventing moisture entering said member.

EDWARD F. JOYCE.